United States Patent
Kawasaki et al.

(10) Patent No.: US 9,085,116 B2
(45) Date of Patent: Jul. 21, 2015

(54) METHOD FOR MANUFACTURING HONEYCOMB STRUCTURE

(71) Applicant: MORIDEN CO., LTD., Tokyo (JP)

(72) Inventors: Toru Kawasaki, Nagoya (JP); Tetsuo Yoshikawa, Ota (JP)

(73) Assignee: MORIDEN CO., LTD. (JP)

( * ) Notice: Subject to any disclaimer, the term of this patent is extended or adjusted under 35 U.S.C. 154(b) by 0 days.

(21) Appl. No.: 14/472,622

(22) Filed: Aug. 29, 2014

(65) Prior Publication Data
US 2015/0075704 A1    Mar. 19, 2015

(30) Foreign Application Priority Data

Sep. 17, 2013   (JP) .................................. 2013-191384

(51) Int. Cl.
*B29D 99/00*   (2010.01)
*B29C 65/00*   (2006.01)

(52) U.S. Cl.
CPC .......... *B29D 99/0089* (2013.01); *B29C 66/438* (2013.01); *Y10T 156/1003* (2015.01); *Y10T 156/1069* (2015.01)

(58) Field of Classification Search
CPC ............ B29C 66/438; Y10T 156/1003; Y10T 156/1069
USPC .......................... 156/197, 260, 290, 291, 292
See application file for complete search history.

(56) References Cited

U.S. PATENT DOCUMENTS

| | | | | |
|---|---|---|---|---|
| 3,066,722 A | * | 12/1962 | Adams et al. | 156/197 |
| 3,912,573 A | * | 10/1975 | Kunz | 156/471 |
| 5,119,535 A | * | 6/1992 | Gnagy et al. | 29/469.5 |
| 5,399,221 A | * | 3/1995 | Casella | 156/274.4 |
| 5,711,992 A | * | 1/1998 | Heitkamp et al. | 427/243 |
| 5,792,295 A | * | 8/1998 | Huebner et al. | 156/197 |
| 6,800,351 B1 | * | 10/2004 | Pflug et al. | 156/196 |
| 2008/0145602 A1 | * | 6/2008 | Hendren et al. | 156/197 |
| 2013/0017759 A1 | * | 1/2013 | Kunimune | 449/35 |

FOREIGN PATENT DOCUMENTS

| | | |
|---|---|---|
| JP | H05-309768 A | 11/1993 |
| JP | H05-345376 A | 12/1993 |
| JP | H09-011372 A | 1/1997 |

* cited by examiner

Primary Examiner — Philip Tucker
Assistant Examiner — John Blades
(74) Attorney, Agent, or Firm — Banner & Witcoff, Ltd.

(57) ABSTRACT

A method for manufacturing a honeycomb structure includes: preparing a base material sheet; forming a plurality of strips by forming a plurality of slits parallel to each other at regular intervals in the base material sheet; twisting each of the strips around an axis along which the strip extends; temporarily forming a plurality of cell areas defined by the strips by temporarily, partially bonding each of the twisted strips to another strip adjacent thereto; and completing the form of the cell areas by performing permanent bonding on the temporarily bonded portions by inserting a mold into the temporarily formed cell areas and heating the strips.

7 Claims, 5 Drawing Sheets

METHOD FOR MANUFACTURING HONEYCOMB STRUCTURE

CROSS-REFERENCE TO RELATED APPLICATION

This application claims priority from Japanese Patent Application No. 2013-191384 filed with the Japan Patent Office on Sep. 17, 2013, the entire content of which is hereby incorporated by reference.

BACKGROUND

1. Technical Field

The present disclosure relates to a method for manufacturing a honeycomb structure.

2. Related Art

Honeycomb structures are conventionally used for, for example, various kinds of board members such as floor members and wall members. The following method is known as a method for manufacturing these kinds of honeycomb structures (honeycomb cores) (for example, JP 05-309768 A (pages 2 to 3, FIG. 1) and JP 09-11372 A (pages 3 to 4, FIG. 1)). In other words, in this method, a plurality of base material sheets to which an adhesive has been applied in stripes is laminated and bonded. The laminate is then expanded in the lamination direction. Therefore, a honeycomb structure is formed.

Specifically, the adhesive is applied to the base material sheet in stripes with a fixed width at regular intervals. Next, when the base material sheets are laminated, the base material sheets are placed such that the positions of the adhesive applied in stripes on adjacent upper and lower layers are displaced by a half pitch. Moreover, separators may be further arranged between the stripes of the adhesive arranged on the base material sheet to maintain a non-bonded state between the adjacent upper and lower base material sheets (for example, JP 09-11372 A (pages 3 to 4, FIG. 1)).

Moreover, as another conventional technique, a method for forming a honeycomb structure by extrusion molding or injection molding is known (for example, JP 05-345376 A (page 2, FIG. 1)). Moreover, a honeycomb structure is further formed also by stacking and bonding honeycombed or corrugated core members formed by extrusion molding or the like.

SUMMARY

A method for manufacturing a honeycomb structure includes: preparing a base material sheet; forming a plurality of strips by forming a plurality of slits parallel to each other at regular intervals in the base material sheet; twisting each of the strips around an axis along which the strip extends; temporarily forming a plurality of cell areas defined by the strips by temporarily, partially bonding each of the twisted strips to another strip adjacent thereto; and completing the form of the cell areas by performing permanent bonding on the temporarily bonded portions by inserting a mold into the temporarily formed cell areas and heating the strips.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the known method in which base material sheets are laminated, bonded, and expanded, the step of applying adhesive to the base material sheet is carried out. Moreover, the adhesive is applied to correct positions. Hence, the efficiency of the manufacturing process can be hardly increased.

Moreover, volatile organic compounds (VOC) to cause air pollution are included in some of the adhesives used to bond the base material sheets. Hence, from an environmental perspective, a bonding method that reduces the use of adhesive is required.

Moreover, there is also a method in which separators for securing non-bonded portions or the like are arranged between base material sheets to restrain the base material sheets from being bonded to each other. In this method, the work of arranging the separators in a correct positional relationship is complicated. Moreover, the step of removing the separators after bonding is also carried out.

Moreover, in the method in which the formed laminate is expanded, the step of cutting the laminate is carried out a plurality of times prior to the step of expanding the laminate. Specifically, a base material sheet is firstly cut in predetermined dimensions prior to the step of applying adhesive or the step of laminating or bonding base material sheets. The cutting is performed such that the cut sheet fits the dimensions of each apparatus and that the cut sheet can efficiently be applied adhesive thereto, laminated, and bonded. The laminate that has been bonded in a block shape is subsequently formed. Furthermore, the dimensions of the laminate are subsequently adjusted to dimensions suitable for a final use. Hence, the laminate is cut in a predetermined width.

Moreover, in the method for forming a honeycomb structure by extrusion molding or injection molding, a die/mold of a complicated shape is used. Moreover, especially if a board-shaped honeycomb core with a large area is formed, a die/mold becomes large. Thus, it leads to not only an increase in equipment costs but also a difficulty in obtaining the uniform quality of honeycomb cells by securing the fluidity of material evenly. Moreover, after the honeycomb structure is formed by extrusion molding or the like, the formed honeycomb structure is further cut in a predetermined thickness.

One object of the present disclosure is to provide a method for efficiently manufacturing a lightweight honeycomb structure with high stiffness, high strength, and excellent environmental friendliness by a simple process.

A method for manufacturing a honeycomb structure according to one embodiment of the present disclosure includes: preparing a base material sheet; forming a plurality of strips by forming a plurality of slits parallel to each other at regular intervals in the base material sheet; twisting each of the strips around an axis along which the strip extends; temporarily forming a plurality of cell areas defined by the strips by temporarily, partially bonding each of the twisted strips to another strip adjacent thereto; and completing the form of the cell areas by performing permanent bonding on the temporarily bonded portions by inserting a mold into the temporarily formed cell areas and heating the strips.

According to the method for manufacturing a honeycomb structure, a plurality of slits is formed in a base material sheet. Thus, a plurality of strips is formed. Next, the strips are twisted. Furthermore, the twisted strip is temporarily, partially bonded to another adjacent strip. In this manner, a plurality of cell areas is temporarily formed. Therefore, the cells (cell areas) of a honeycomb structure can be temporarily formed in a continuous process with high efficiency.

Moreover, a mold is inserted into the above-mentioned temporarily formed cell areas to permanently bond the strips by heating. Thus, the cell areas can be formed in a predetermined shape. Furthermore, the strips can be bonded firmly to each other. Therefore, the substantially uniform and high-quality cells can be formed. Hence, the lightweight honeycomb structure with high stiffness and high strength can efficiently be manufactured.

Moreover, the slits are formed such that the width of the strip corresponds to the thickness of a board as a finished product. After the cell areas are shaped using the mold, therefore, it becomes unnecessary to adjust the thickness of the honeycomb structure (for example, to cut the honeycomb structure). In other words, the honeycomb structure can be completed by thermal bonding with the mold.

Moreover, the temporary bonding may include heating and pressing parts of the strips. In this case, the strips can be bonded to each other without using adhesive. Thus, the need of the step of applying adhesive and the step of laminating base material sheets is eliminated. Hence, the manufacturing process can be simplified. Moreover, the release of volatile organic compounds to cause air pollution and the like can be suppressed by reducing the use of adhesive.

Hereinafter, a honeycomb structure and a manufacturing method for the same according to one embodiment of the present disclosure are described in detail with reference to the drawings.

Figure 1:
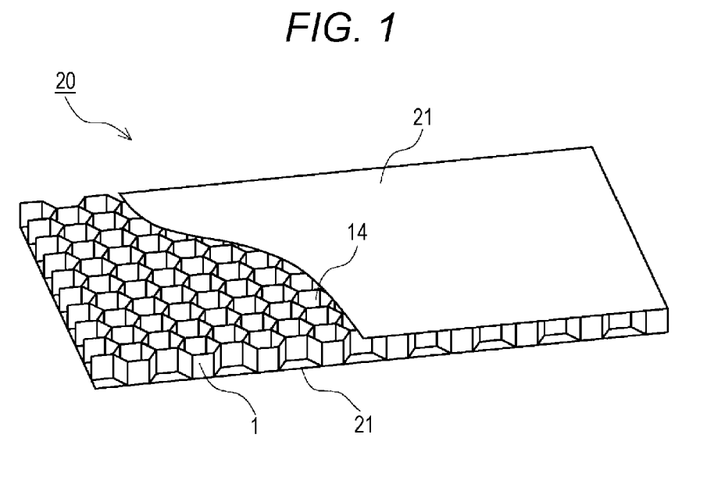
FIG. 1 is a perspective view of a vehicle interior board that uses a honeycomb structure according to an embodiment.

Firstly, with reference to FIG. 1, a description is given of a schematic configuration of a honeycomb structure 1 and a vehicle interior board 20 using the honeycomb structure 1

FIG. 1 is a perspective view of the vehicle interior board 20 including the honeycomb structure 1 according to the embodiment.

The honeycomb structure 1 (honeycomb core) according to the embodiment are used as core materials (cores) of various kinds of board-shaped structural members such as floor members and wall members. For example, the honeycomb structure 1 can be used as a core material of the vehicle interior board 20 as illustrated in FIG. 1, and core materials of general structural members such as buildings, fittings, and furniture.

The vehicle interior board 20 is a substantially plate-shaped structural member, and is used as interiors of transport machines such as vehicles, railway vehicles, aircraft, and ships. The vehicle interior board 20 includes the substantially plate-shaped honeycomb structure 1 as a core material. The honeycomb structure 1 includes skin materials 21 bonded to both of its principal surfaces (top and bottom surfaces).

The skin material 21 is a thin plate-shaped (sheet-shaped) member including various synthetic resin materials or various metal materials. The bonding of the skin materials 21 to both principal surfaces of the honeycomb structure 1 enables the formation of a board-shaped structural member that is lightweight, and has high stiffness and strength. Moreover, an unillustrated finish skin material may be pasted on a surface of the skin material 21 as necessary. Examples of the finish skin material include various sheet-shaped materials, such as a non-woven fabric, woven fabric, textile, and carpet, which are made from raw materials such as resin.

Next, the configuration and manufacturing method of the honeycomb structure 1 are described in detail with reference to FIGS. 2 to 6.

Firstly, the step of forming strips 12 is described with reference to FIG. 2.

Figure 2:
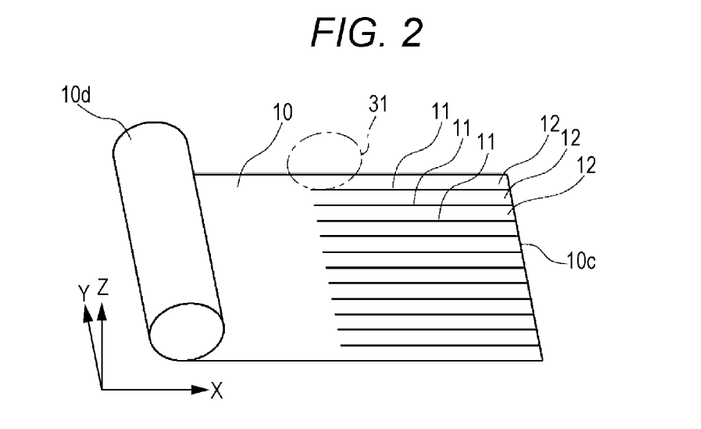
FIG. 2 is a perspective view illustrating the step of forming strips of the honeycomb structure according to the embodiment.

FIG. 2 is a perspective view illustrating the step of forming the strips 12 of the honeycomb structure 1.

As illustrated in FIG. 2, firstly, a base material sheet 10 is prepared. A plurality of slits 11 substantially parallel to each other is subsequently formed at substantially regular intervals from one end 10c side of the base material sheet 10. Specifically, the slits 11 are formed by, for example, cutting the base material sheet 10 by disk-shaped rotary cutters 31 or the like. The formation of the slits 11 results in the partially cut and separated base material sheet 10. Thus, the resulting strips 12 extend in substantially parallel and are substantially equal in width.

The slits 11 are formed such that the interval of the slits 11, or the width of the strip 12 (the dimension in Y-direction), corresponds to the thickness of the board (the honeycomb structure 1) as a finished product. Specifically, for example, the strip 12 has a width of 10 to 20 mm.

The formation of the strips 12 is achieved by, for example, using a slitter machine including a plurality of the rotary cutters 31 arranged at predetermined intervals. The slits 11 (the strips 12) can be therefore formed highly efficiently and continuously from the one end 10c side of the base material sheet 10. In other words, the strips 12 are formed by continuously cutting the base material sheet 10 with the rotary cutters 31 while feeding the base material sheet 10 in an X direction illustrated in FIG. 2.

Moreover, the base material sheet 10 in a roll (10d) can also be used. In this case, the slits 11 can be formed in the base material sheet 10 while the one end 10c of the base material sheet 10 is being pulled from the roll. The strips 12 can be therefore formed more efficiently, and continuously. The shape of the base material sheet 10 is not limited to the roll (10d) but may be of another shape such as a plate shape previously processed in a predetermined size.

Moreover, the method for cutting the base material sheet 10 is not limited to the above-mentioned method that uses the rotary cutters 31. Another cutting method (for example, a cutting method using a laser) can also be adopted.

The base material sheet 10 may be a woven fabric or textile whose principal materials may be any of various synthetic resin materials. In this case, the base material sheet 10 is flexible in assembling and is easy to handle. Thus, the work of forming the strips 12 and the like can easily be performed. Moreover, thermoforming, which is described later, allows the base material sheet 10 to exhibit excellent bonding strength and stiffness. Hence, the formed honeycomb structure 1 can be provided with high stiffness and strength.

Especially, the base material sheet 10 according to the embodiment may have two or more different melting points. In other words, the base material sheet 10 may include a raw material designed to have two or more different melting points, or two or more kinds of raw materials having different melting points. For example, a raw material of the base material sheet 10 may have a low melting point of 100 to 130° C. and a high melting point of 150 to 170° C. Thus, temporary bonding and permanent bonding (final shaping), which are described later, can be performed under different temperature conditions, respectively. Thus, the efficiency of assembling work can be increased, and the precision of the dimensions and strength of a finished product can be increased. The details are described later.

Moreover, any of a thermoplastic resin and a thermosetting resin can be adopted as the raw material (material) of the base material sheet 10. If the thermoplastic resin is used as a raw material of the base material sheet 10, workability upon final shaping after the temporary bonding is improved as described below.

Moreover, for example, a biodegradable plastic such as polylactic acid (PLA) or polybutylene succinate (PBS) may be used as a raw material of the base material sheet 10. Thus, environmental destruction by disposing of the honeycomb structure 1 can be prevented or suppressed. In other words, the disposed honeycomb structure 1 is decomposed by the action of microorganisms existing in the natural world.

Moreover, a plastic derived from renewable biomass (what is called a biomass plastic) can be adopted as a raw material of the base material sheet 10. For example, if plant-based polyethylene (PE) having, as a raw material, ethanol (bioethanol) derived from sugar cane or the like is adopted, the amount of carbon dioxide generated and emitted during the time from the manufacture to disposal of the material can be significantly reduced. In other words, the amount of carbon dioxide generated and emitted during the time from the production to decomposition of the raw material can be reduced to approximately zero (carbon neutrality can be achieved) other than energy consumed during the process of manufacture or transportation.

In the embodiment, polylactic acid may be used as a raw material of the base material sheet 10. Polylactic acid is biomass and a biodegradable thermoplastic resin. In this manner, a biodegradable biomass plastic can be adopted as the raw material of the base material sheet 10 to prevent or suppress the adverse impact of waste disposal on the environment and to achieve carbon neutrality.

Moreover, polylactic acid has suitable thermal properties that allow adjustment and application in a thermal bonding method to be described later. Thus, the use of polylactic acid as the base material sheet 10 and the use of the bonding method described later can allow a simple process to efficiently manufacture a lightweight honeycomb structure 1 with high stiffness, high strength, and excellent environmental friendliness.

Next, the step of twisting the formed strips 12 is described with reference to FIGS. 3A and 3B.

Figure 3A:
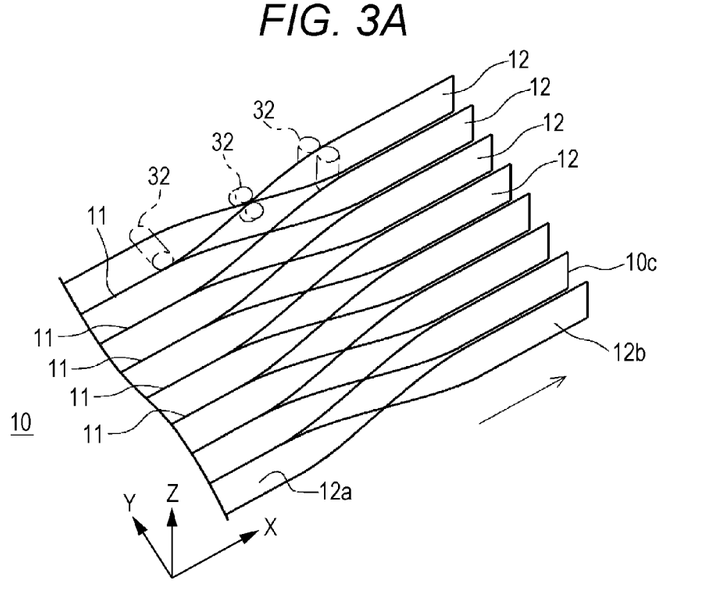
FIG. 3A is a perspective view illustrating the step of twisting the strips of the honeycomb structure according to the embodiment.

FIG. 3A is a perspective view illustrating the step of twisting the strips 12 of the honeycomb structure 1. FIG. 3B is a plan view illustrating the same step.

Figure 3B:
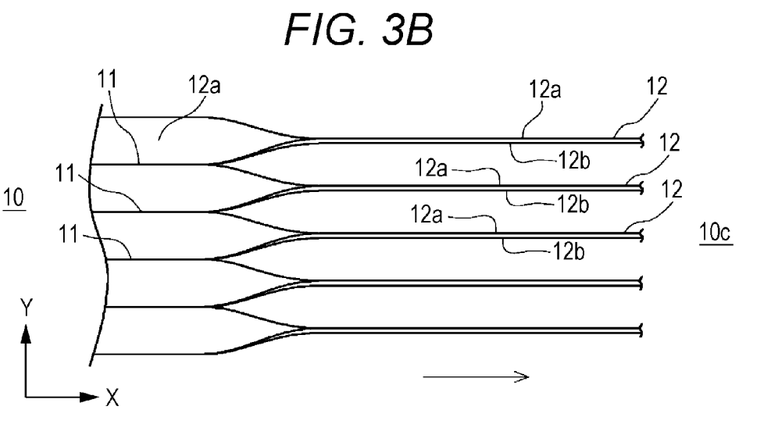
FIG. 3B is a plan view illustrating the step of twisting the strips of the honeycomb structure according to the embodiment.

As illustrated in FIGS. 3A and 3B, each strip 12 is twisted at an angle of approximately 90° with its extension direction (the X direction) as an axis. In other words, principal surfaces of the base material sheet 10 are placed horizontally (on an X-Y plane), the strip 12 is twisted such that its principal surfaces 12a and 12b are placed vertically (on an X-Z plane) on the end 10c side.

Hence, the strips 12 are arranged such that their principal surfaces are parallel to and face each other on the end 10c side. In more detail, as illustrated in FIG. 3B, one principal surface 12a of the strip 12 faces the other principal surface 12b of another adjacent strip 12, the other principal surface 12b being the backside of the one principal surface 12a.

A twist can be given to the strip 12 in various methods. As illustrated in FIG. 3A, for example, a plurality of guide rollers 32 having individually different angles of inclination of the axis of rotation may be used. In this case, the strip 12 is fed in the extension direction (X direction) while being twisted, and the twisted strip 12 can be therefore obtained. Specifically, for example, the following feeding device can be used. The plurality of guide rollers 32 is arranged along the feed direction of the strip 12 (the X direction) in the feeding device. Furthermore, the orientation of the axis of rotation changes among these guide rollers 32, sequentially from the horizontal (Y direction) to the vertical (Z direction) along the feed direction of the strip 12 (the X direction).

Next, the step of temporarily forming cell areas 14, including temporarily bonding the twisted strips 12, is described with reference to FIGS. 4A to 4C.

Figure 4A:
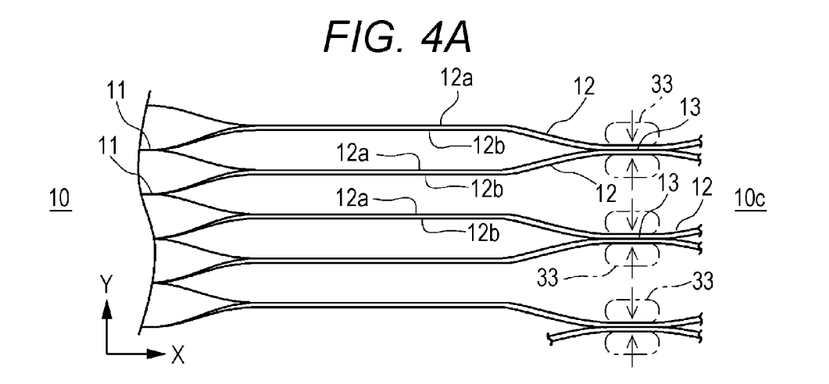
FIG. 4A is a plan view illustrating the step of temporarily bonding the strips of the honeycomb structure according to the embodiment.

FIG. 4A is a plan view illustrating the step of temporarily bonding the strips 12 of the honeycomb structure 1. FIG. 4B is a plan view illustrating the step of changing the bonding positions and further temporarily bonding the strips 12 of the honeycomb structure. FIG. 4C is a plan view illustrating the step of temporarily forming the cell areas 14 by further changing the bonding positions and further temporarily bonding the strips of the honeycomb structure.

Firstly, first temporary bonding is performed. In other words, as illustrated in FIG. 4A, two strips 12 adjacent to each other are paired. Thus, the plurality of strips 12 are separated in pairs. The paired two strips 12 are temporarily bonded on the principal surface 12a of one of the strips 12 and the principal surface 12b of the other strip 12. Specifically, two strips 12 are temporarily, partially bonded on the principal surface 12a of the one of the strips 12 and the principal surface 12b of the other adjacent strip 12.

The temporary bonding is performed by heating a spot to be temporarily bonded (a bonding portion 13) and pressing the spot with, for example, a pressurizing jig 33 that applies pressure in such a manner as to sandwich the spot. If the base material sheet 10 has two melting points, the heating temperature can be set to a temperature corresponding to the lower melting point of the base material sheet 10. Specifically, the heating temperature is, for example, 100 to 130° C. Moreover, if the base material sheet 10 has three or more melting points, the heating temperature may be a temperature corresponding to the lowest melting point of the base material sheet 10. Thus, parts having the lower melting point of materials constituting the base material sheet 10 are melted. Therefore, the strips 12 are temporarily, partially bonded at the temporary bonding spots (the bonding portions 13).

Next, second temporary bonding is performed. In other words, as illustrated in FIG. 4B, the temporarily, partially bonded strip 12 is fed toward the direction of the end 10c (the X direction). Thus, a spot corresponding to a different position on the principal surface 12a or 12b of the strip 12 along the extension direction (X direction) is targeted for temporary bonding.

Furthermore, the pairs of the plurality of strips 12 are changed. In other words, one strip 12 is paired with an adjacent strip 12 opposite to the adjacent strip 12 that was temporarily bonded in the first temporary bonding. The paired two strips 12 are then temporarily bonded on the principal surface 12a of the one strip 12 and the principal surface 12b of the other strip 12. Therefore, in the second temporary bonding, the principal surface 12b (12a) of the strip 12, which is the backside of the principal surface 12a (12b) used in the first temporary bonding, and the principal surface 12a (12b) of another adjacent strip 12 are used for the temporary bonding. Specifically, for example, each strip 12 temporarily bonded on the principal surface 12a in the first temporary bonding is temporarily, partially bonded on the principal surface 12b on the backside of the principal surface 12a to another adjacent strip 12 on the principal surface 12a of the another strip 12.

The first temporary bonding is then performed again. In other words, as illustrated in FIG. 4C, the strip 12 temporarily bonded at two locations is fed toward the extension direction of the end 10c (the X direction). Thus, a spot corresponding to a different position on the principal surface 12a or 12b of the strip 12 along the extension direction (X direction) is targeted for the temporary bonding. Furthermore, the pairs of the plurality of strips 12 are changed to the pairs of the first temporary bonding. Therefore, two strips 12 are temporarily bonded on the principal surfaces 12a and 12b of the strips 12 used in the first temporary bonding.

From then on, the second temporary bonding as described above is performed. The first temporary bonding and the second temporary bonding are alternately repeated in this manner. In other words, one strip 12 is temporarily bonded, alternately, on one principal surface 12a and the other principal surface 12b to other strips 12 each facing either of the principal surfaces. Thus, a plurality of the cell areas 14 defined by the strips 12 are temporarily formed.

The temporary bonding is performed by heating and pressing parts of the strips 12. In other words, the temporary bonding enables the strips 12 to be bonded to each other without using adhesive. The manufacturing process can be therefore simplified because of no need of the step of applying adhesive and the step of laminating base material sheets. Moreover, the release of volatile organic compounds to cause air pollution and the like can be suppressed by reducing the use of adhesive.

Next, the step of expanding the honeycomb structure 1 including the temporarily formed cell areas 14 is described with reference to FIGS. 5A and 5B.

Figure 5A:
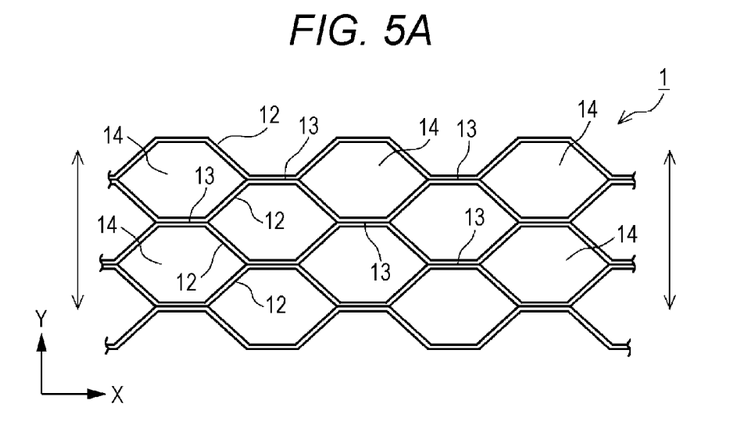
FIG. 5A is a plan view illustrating a state of the honeycomb structure before expansion in the step of expanding the honeycomb structure according to the embodiment.
Figure 5B:
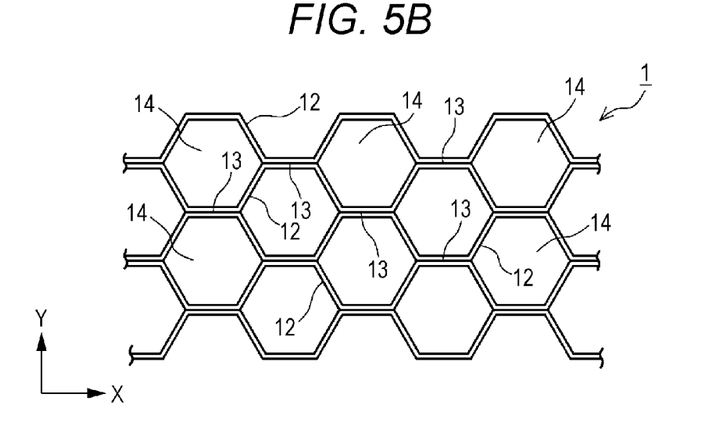
FIG. 5B is a plan view illustrating a state of the honeycomb structure after expansion in the step of expanding the honeycomb structure according to the embodiment.

FIGS. 5A and 5B are plan views illustrating the step of expanding the honeycomb structure 1. FIG. 5A illustrates a state of the honeycomb structure 1 before expansion. FIG. 5B illustrates a state of the honeycomb structure 1 after expansion.

The first temporary bonding and the second temporary bonding, which are described above, are repeated to temporarily form the plurality of cell areas 14 as illustrated in FIG. 5A. In the expansion step of the embodiment, the honeycomb structure including the plurality of temporarily formed cell areas is expanded. In other words, in the expansion step, the honeycomb structure 1 including the temporarily formed cell areas 14 are stretched in the breadth direction (Y direction) (see FIG. 5B). Thus, openings into which a mold 34 (see FIG. 6), which is described later, is inserted are secured in the cell areas 14. The breadth direction (Y direction) is, for example, a direction substantially orthogonal to a direction in which the strip 12 extends.

The expansion step of the embodiment is different from the step of expanding a laminate of the known technology. In other words, in the expansion step of the known technology, a honeycomb structure is formed and finished by expanding a laminate in the lamination direction. In contrast, in the embodiment, the cell areas 14 forming the honeycomb structure have already temporarily been formed by the temporary bonding in a state of being open in the vertical direction. Furthermore, the honeycomb structure is finished not in the expansion step but by the mold 34 to be described later. Hence, the honeycomb structure 1 is simply required in the expansion step to be stretched to the extent that the mold 34 can be inserted into the openings of the cell areas 14.

Next, the step of shaping the cell areas 14 of the honeycomb structure 1 (the final shaping) is described with reference to FIG. 6.

Figure 6:
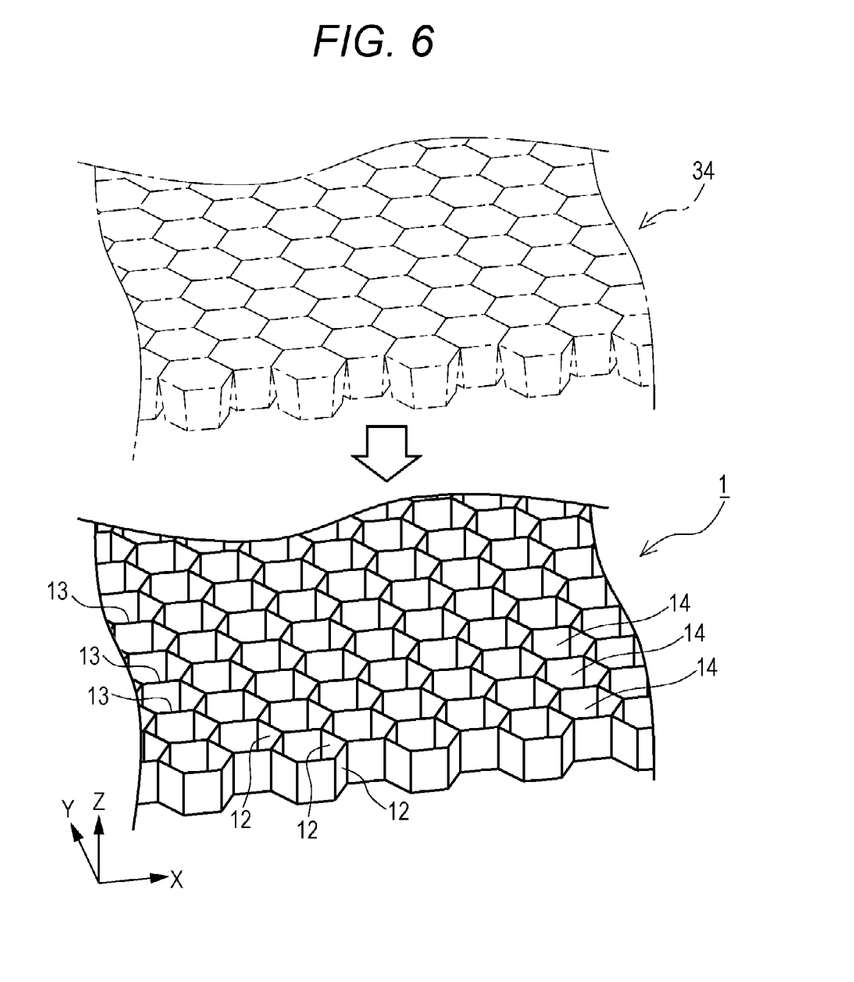
FIG. 6 is a perspective view illustrating the step of shaping cell areas by bonding the strips of the honeycomb structure according to the embodiment.

FIG. 6 is a perspective view illustrating the step of shaping the cell areas 14 using the mold 34.

As illustrated in FIG. 6, in this step, the mold 34 is inserted into the cell areas 14, which have temporarily been formed and been stretched. The cell areas 14 are subsequently pressed under the thermal condition. The shapes of the cell areas 14 are therefore fixed in this manner. Thus, the cell areas 14 are formed in a final shape. In this step, the cell areas 14 are shaped under the thermal condition. Thus, the cell areas 14 can be cured while holding a predetermined shape. The strips 12 are therefore bonded (permanently bonded) to each other at the temporarily bonded spots (the bonding portions 13).

The shape of the cell area 14 is, for example, a substantial hexagon. However, the shape of the cell area 14 is not limited to this. For example, the cell area 14 may be formed into a triangle, square, another polygon, or another arbitrary shape that can continuously be arranged.

If the base material sheet 10 has two melting points, the heating temperature in the step of shaping the cell areas 14 may be a temperature corresponding to the higher melting point of the base material sheet 10. Specifically, the heating temperature is, for example, 150 to 170° C. Moreover, if the base material sheet 10 has three or more melting points, the heating temperature may be a temperature corresponding to the highest melting point of the base material sheet 10. Moreover, the press pressure can be set to, for example, approximately 0.1 kPa. Thus, substantially all the raw materials constituting the base material sheet 10 melt. Therefore, the entire honeycomb structure 1 can be finished strongly.

As described above, the width (the dimension in Y-direction) of the strip 12 is previously formed in such a manner as to correspond to the thickness of the board as a finished product. Hence, there is no need to carry out steps such as the cutting step to adjust the thickness of the honeycomb structure 1, subsequent to the step of shaping the cell areas 14 with the mold 34. In other words, with the thermal bonding step with the mold 34, the honeycomb structure 1 as a final product is completed.

The above-described steps allow the efficient manufacture of the lightweight honeycomb structure 1 having a substantially uniform cellular form with high stiffness, high strength, and excellent environmental friendliness. As illustrated in FIG. 1, the skin materials 21 or the like may be pasted on the principal surfaces of the honeycomb structure 1. Thus, a board member suitable for various uses, such as the vehicle interior board 20, can be produced.

In the above description, the temporary bonding method by heating or pressurizing is illustrated. However, the temporary bonding method is not limited to this. For example, the temporary bonding may be performed using adhesive or the like instead of the method by heating or pressurizing. Even if the temporary bonding is performed using adhesive or the like, the simple and continuous manufacturing process with high productivity is achieved in which the cell areas 14 is finally shaped after the strips 12 are formed, twisted, and temporarily bonded.

Moreover, the strips 12 can be bonded firmly to each other by the final thermoforming using the mold 34. Hence, the use amount of adhesive upon the temporary bonding can be smaller than the known technology. In other words, the use amount of adhesive can be reduced. Moreover, especially the method using adhesive for the temporary bonding has an advantage that a raw material having a single melting point can be used as a base material sheet 10. In other words, the use of adhesive for the temporary bonding also enables the base material sheet 10 having a single melting point to increase productivity in manufacture of a honeycomb structure by applying the manufacturing process of the embodiment.

The present disclosure is not limited to the above embodiment. Various modifications can be made to the present disclosure without departing from a gist thereof.

For example, in the embodiment, the plurality of slits 11 substantially parallel to each other is formed at substantially regular intervals from the one end 10c side of the base material sheet 10. However, the slits 11 in the base material sheet 10 are not limited to being formed from the end of the base material sheet 10 but can be formed from any part of the base material sheet 10.

For example, the slitter machine including the plurality of rotary cutters 31 arranged at the predetermined intervals is used. Thus, the slits 11 can highly efficiently be processed continuously from the one end 10c side of the base material sheet 10 to form the strips 12.

Moreover, in the step of twisting the strips 12, one end side (the end 10c side) of each strip 12 may be twisted at an angle of approximately 90° with the extension direction of the strip 12 (the X direction) as an axis. In other words, assuming that the principal surfaces of the base material sheet 10 are placed horizontally (on the X-Y plane), the strips 12 may be twisted such that their principal surfaces 12a and 12b are placed vertically (on the X-Z plane).

In terms of a twist of the strip 12, as illustrated in FIG. 3A, for example, the plurality of guide rollers 32 each having a different angle of inclination of the axis of rotation is used to feed the strip 12 toward the extension direction (X direction) while twisting the strip 12, resulting in the twisted strip 12. Specifically, it is sufficient if, for example, the feeding device is used in which the plurality of guide rollers 32 is arranged such that the axis of rotation changes among them, sequentially from the horizontal (Y direction) to the vertical (Z direction) toward the feed direction of the strip 12 (the X direction).

As illustrated in FIG. 4A, each of the strips 12 may be paired with the adjacent strip 12 on its one side to make a pair of two strips 12 and separate the pairs from each other, and then the principal surfaces 12a and 12b of the paired strips 12 may be temporarily bonded to each other. Specifically, the principal surface 12a of one of the paired strips 12 is temporarily, partially bonded to the principal surface 12b of the other adjacent strip 12.

Figure 4B:
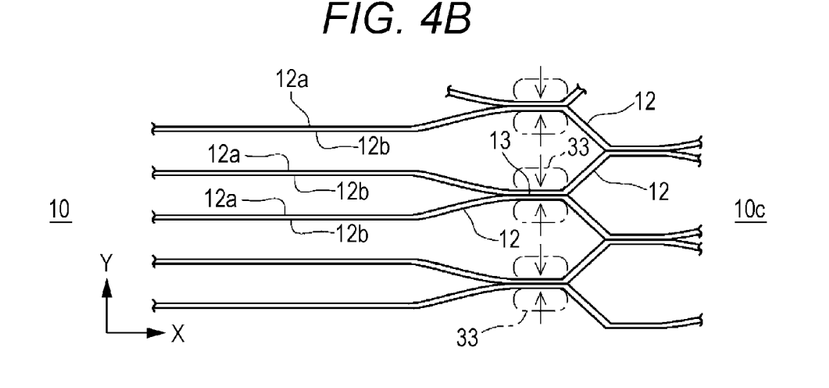
FIG. 4B is a plan view illustrating the step of changing bonding positions and further temporarily bonding the strips of the honeycomb structure.

Furthermore, as illustrated in FIG. 4B, the temporarily, partially bonded strip 12 may be fed toward the direction of the end 10c (the X direction) to change the position with respect to the extension direction of the strip 12 (the X direction). Subsequently, the principal surface 12a or 12b on a side opposite to the temporarily bonded spot is temporarily bonded to still another adjacent strip 12. Specifically, for example, one strip 12 whose principal surface 12a has temporarily been bonded is temporarily, partially bonded on the principal surface 12b opposite to the principal surface 12a to another adjacent strip 12 on the principal surface 12a.

Figure 4C:
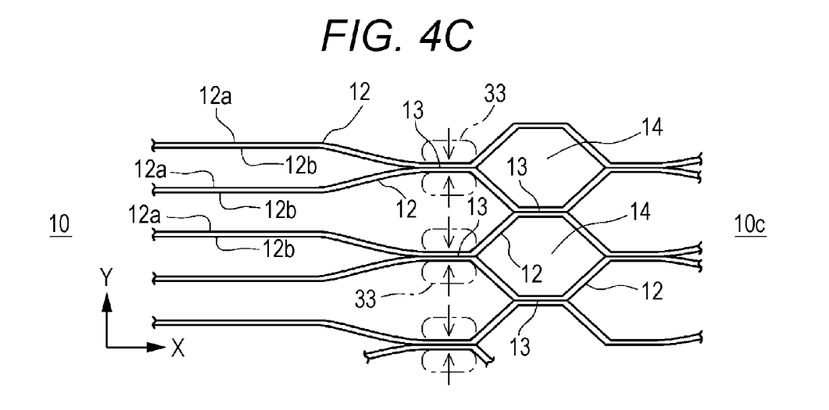
FIG. 4C is a plan view illustrating the step of temporarily forming cell areas by further changing the bonding positions and further temporarily bonding the strips of the honeycomb structure.

As illustrated in FIG. 4C, the temporary bonding may be repeated while changing positions in the extension direction of the strip 12 (the X direction) and changing the principal surfaces 12a and 12b to be temporarily bonded. In other words, the one principal surface 12a and the other principal surface 12b of one strip 12 are alternated to be temporarily bonded to other adjacent strips 12 facing to the principal surfaces 12a and 12b of the one strip 12. Thus, the plurality of cell areas 14 is temporarily formed in such a manner as to be sandwiched between the strips 12.

Moreover, the method for manufacturing a honeycomb structure according to the one embodiment of the present disclosure may be the following first method for manufacturing a honeycomb structure. In other words, the first method for manufacturing a honeycomb structure includes the steps of: preparing a base material sheet, processing a plurality of slits parallel to each other at regular intervals from one end side of the base material sheet, and forming a plurality of strips; twisting the one end side of each strip with the extension direction as an axis; temporarily, partially bonding each of the twisted strips to another adjacent strip, and temporarily forming a plurality of cell areas sandwiched between the strips; and inserting a mold into the temporarily formed cell areas to apply heat, and bonding the strips while shaping the cell areas.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for manufacturing a honeycomb structure, the method comprising:
    preparing a base material sheet;
    forming a plurality of strips by forming a plurality of slits parallel to each other at regular intervals in the base material sheet;
    twisting each of the strips around an axis along which the strip extends;
    temporarily forming a plurality of cell areas defined by the strips by temporarily, partially bonding each of the twisted strips to another strip adjacent thereto; and
    completing the form of the cell areas by performing permanent bonding on the temporarily bonded portions by inserting a mold into the temporarily formed cell areas and heating the strips.

2. The method for manufacturing a honeycomb structure according to claim 1, wherein the base material sheet has two or more different parts, each of which has a different melting point.

3. The method for manufacturing a honeycomb structure according to claim 2, wherein
the temporary bonding includes heating the strips at a temperature corresponding to the part with the lowest melting point of the base material sheet, and
the permanent bonding includes heating the strips at a temperature corresponding to the part with the highest melting point of the base material sheet.

4. The method for manufacturing a honeycomb structure according to claim 1, wherein the base material sheet includes a thermoplastic resin.

5. The method for manufacturing a honeycomb structure according to claim 1, wherein the base material sheet includes a biodegradable plastic.

6. The method for manufacturing a honeycomb structure according to claim 1, wherein the base material sheet includes polylactic acid.

7. The method for manufacturing a honeycomb structure according to claim 1, further comprising expanding a honeycomb structure including the plurality of temporarily formed cell areas.

* * * * *